(12) United States Patent
Boecker et al.

(10) Patent No.: US 9,428,044 B2
(45) Date of Patent: Aug. 30, 2016

(54) CLOSED TANK SYSTEM

(71) Applicant: TI Automotive Technology Center GmbH, Rastatt (DE)

(72) Inventors: Albert J. Boecker, Ettlingen (DE); Alex Ehler, Rastatt (DE); Patrick Gmuend, Karlsruhe (DE); Peter Grauer, Steinweiler (DE); Walter B. Hersel, Leonberg (DE); Gerrit A. Michaelis, Friesenheim (DE); Matthias B. Olbrich, Rastatt (DE)

(73) Assignee: TI Automotive Technology Center GmbH, Rastatt (DE)

( * ) Notice: Subject to any disclaimer, the term of this patent is extended or adjusted under 35 U.S.C. 154(b) by 33 days.

(21) Appl. No.: 14/341,910

(22) Filed: Jul. 28, 2014

(65) Prior Publication Data
US 2015/0034175 A1 Feb. 5, 2015

Related U.S. Application Data

(60) Provisional application No. 61/861,187, filed on Aug. 1, 2013, provisional application No. 61/863,483, filed on Aug. 8, 2013.

(51) Int. Cl.
*B60K 15/077* (2006.01)
*B60K 15/04* (2006.01)
*B60K 15/035* (2006.01)
(Continued)

(52) U.S. Cl.
CPC ......... *B60K 15/04* (2013.01); *B60K 15/03177* (2013.01); *B60K 15/03504* (2013.01); *F02M 25/089* (2013.01); *B60K 2015/03217* (2013.01); *B60K 2015/03296* (2013.01); *B60K 2015/03514* (2013.01); *Y10T 137/7287* (2015.04);
(Continued)

(58) Field of Classification Search
CPC .................. B60K 15/077; B60K 201/03217; B60K 15/03504; Y10T 137/7287; Y10T 137/85954
USPC ............................. 220/564; 137/588; 141/59
See application file for complete search history.

(56) References Cited

U.S. PATENT DOCUMENTS 5,590,697 A * 1/1997 Benjey et al. .................. 141/59
6,000,426 A * 12/1999 Tuckey et al. ................ 137/588
(Continued)

FOREIGN PATENT DOCUMENTS

DE 102007026817 B3 10/2008
EP 1642760 A2 4/2006
(Continued)

OTHER PUBLICATIONS

EP Extended Search Report for EP Application No. 14179184.8 dated Dec. 12, 2014, 6 pages.

*Primary Examiner* — Anthony Stashick
*Assistant Examiner* — Raven Collins
(74) *Attorney, Agent, or Firm* — Brinks Gilson & Lione

(57) ABSTRACT

In at least some implementations, a fuel tank includes a tank body defining a chamber adapted to receive liquid fuel therein, a reinforcement for the tank body to permit the pressure within the chamber to exceed the vapor pressure of a fuel to be received within the chamber, and an inlet to the tank body through which fuel is added to the chamber. The inlet is configured to mate with a refueling nozzle through which fuel is added to the chamber to permit refueling the tank and maintaining the pressure in the chamber above atmospheric pressure.

17 Claims, 3 Drawing Sheets

(51) Int. Cl.
*F02M 25/08* (2006.01)
*B60K 15/03* (2006.01)

(52) U.S. Cl.
CPC ... *Y10T137/7837* (2015.04); *Y10T 137/85954* (2015.04); *Y10T 137/86043* (2015.04)

(56) References Cited

U.S. PATENT DOCUMENTS

| | | |
|---|---|---|
| 6,302,133 B1 | 10/2001 | Kobayashi et al. |
| 6,405,747 B1 | 6/2002 | King et al. |
| 6,604,539 B1 | 8/2003 | Strohmayer et al. |
| 6,964,268 B2 | 11/2005 | Stickel |
| 7,347,191 B2 | 3/2008 | Atwood et al. |
| 7,491,258 B2 | 2/2009 | Gouzou et al. |
| 7,520,293 B2 | 4/2009 | Hilderley et al. |
| 7,617,851 B2 | 11/2009 | Barnes et al. |
| 7,631,635 B2 | 12/2009 | Hochstein et al. |
| 8,622,074 B2 | 1/2014 | Hochstein et al. |
| 8,721,956 B2 | 5/2014 | Boecker et al. |
| 2003/0127134 A1* | 7/2003 | Mills .................. 137/202 |
| 2009/0324866 A1 | 12/2009 | Bocker et al. |
| 2011/0068109 A1 | 3/2011 | Boecker et al. |
| 2012/0074028 A1* | 3/2012 | Martin .............. B29C 49/22 206/524.6 |
| 2014/0060665 A1* | 3/2014 | Gamble ........ B60K 15/03519 137/202 |

FOREIGN PATENT DOCUMENTS

| | | |
|---|---|---|
| EP | 2272704 A1 | 1/2011 |
| WO | WO0047437 A1 | 8/2000 |
| WO | WO0130601 A1 | 5/2001 |

* cited by examiner

CLOSED TANK SYSTEM

REFERENCE TO CO-PENDING APPLICATIONS

This application claims the benefit of U.S. Provisional Application Nos. 61/861,187 filed Aug. 1, 2013 and 61/863,483 filed Aug. 8, 2013, which are incorporated herein by reference in their entirety.

TECHNICAL FIELD

The present disclosure relates generally to a vehicle fuel tank.

BACKGROUND

Many vehicles include fuel tanks that hold fuel that is eventually supplied to a prime mover like an internal combustion engine to support operation of the engine. In addition to holding fuel, fuel tanks commonly house components within their interiors such as pumps, valves, and the like. And the fuel tanks may be associated with large capacity vapor handling systems include large vapor canisters to manage the fuel vapor that is generated within the tank, which is maintained at or very near atmospheric pressure, and inhibit fuel vapor from escaping to the atmosphere. These larger vapor handling systems add weight and cost to a vehicle.

SUMMARY

In at least some implementations, a fuel tank includes a tank body defining a chamber adapted to receive liquid fuel therein, a reinforcement for the tank body to permit the pressure within the chamber to exceed the vapor pressure of a fuel to be received within the chamber, and an inlet to the tank body through which fuel is added to the chamber. The inlet is configured to mate with a refueling nozzle through which fuel is added to the chamber to permit refueling the tank and maintaining the pressure in the chamber above atmospheric pressure.

In at least some implementations, a fuel tank includes a tank body defining a chamber adapted to receive liquid fuel therein, a valve to limit fluid flow from the chamber and permit the pressure within the chamber to exceed the vapor pressure of a fuel to be received within the chamber, and an inlet to the tank body through which fuel is added to the chamber. The inlet is configured to mate with a refueling nozzle through which fuel is added to the chamber to permit refueling the tank and maintaining the pressure in the chamber above atmospheric pressure.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
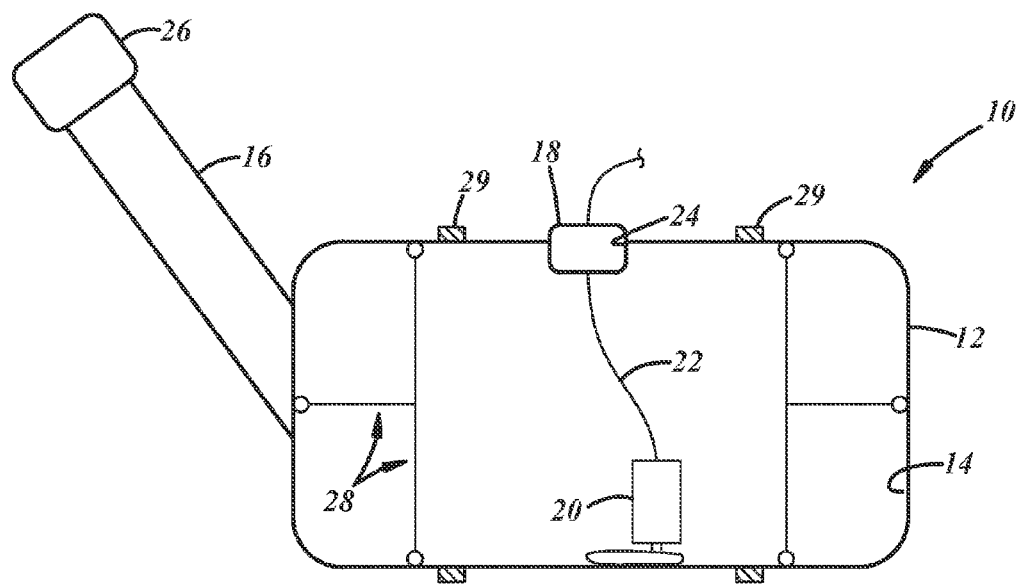
FIG. 1 is a diagrammatic view of a fuel tank system.

Referring in more detail to the drawings, FIG. 1 illustrates a vehicle fuel tank 10 designed to contain a volume of fuel to support operation of the vehicle's engine. The fuel tank 10 may have a tank body 12 defining an interior chamber 14 in which fuel is received and a fill pipe 16 through which fuel is admitted into the chamber 14. If desired, an overpressure relief valve 18 that opens only when the pressure in the fuel tank 10 is above a threshold level may also be provided. A fuel pump 20 may be located inside the fuel tank 10, or outside of the fuel tank if desired. The fuel pump 20 may take in fuel from the fuel tank chamber 14 and deliver it under pressure to fuel system components (e.g. a fuel rail and fuel injectors) downstream of the fuel tank. The fuel pump 20 may be of conventional construction and arrangement and will not be discussed further. The output from the fuel pump 20 may be provided through a conduit 22 that passes through an opening 24 of the fuel tank, preferably in the same area as the relief valve 18 to limit the number of openings through the fuel tank.

The fuel tank 10 may be constructed to contain liquid fuel at a pressure higher than conventional passenger vehicle fuel tank systems. In at least certain embodiments, the fuel tank 10 may contain fuel at a pressure above the vapor pressure of the fuel to prevent formation of fuel vapor in the fuel tank, for example, at a pressure higher than 35 kPa and up to 150 kPa or a pressure that can naturally occur in a fuel system under the range of environmental conditions of use. This will reduce or eliminate the need to provide fuel vapor handling systems, such as carbon canisters and related conduits and valves. While the system could be externally pressurized, it is not necessary to do so and the pressure generated or realized in the tank may occur naturally under the range of environmental conditions the vehicle may experience.

To do this, the fill pipe 16 may be selectively closed, such as by one or more valves, to prevent loss of pressure upon filling the tank. And the refueling nozzles used to provide fuel into the fuel tank may also be configured to seal with the fill pipe 16 and provide a pressurized supply of fuel to the tank 10. To this end, the fill pipe 16 may include a head 26 that includes features complementary to the refueling nozzle to receive and adequately seal against the refueling nozzle. The relatively high pressure at which the refueling operation occurs will also reduce or prevent formation of fuel vapor, thereby reducing emissions normally associated with refueling and reducing or eliminating the need for a carbon canister or other vapor handling components.

The tank body 12 itself may be formed from any suitable material including, for example, metals and/or plastics. To bear the internal pressures discussed above, various support structures may be incorporated into and/or about the exterior of the fuel tank especially when the tank is formed from plastics. In that regard, the tank may be formed from any number of layers of plastic material and may include structure and vapor barrier layers as is known in the art.

Also, the tank may be formed by any suitable method including, but not limited to, blow molding, injection molding, vacuum forming and the like. In one implementation, the tank is formed by an extrusion blow molding process. In that process, a molten parison of plastic material is extruded and provided into a blow mold. The parison may be pre-blown by the introduction of a pressurized gas into a closed interior of the parison to initially expand the parison outwardly within a cavity of the blow mold. Thereafter, the parison may be severed, torn or otherwise manipulated to permit access to the interior of the parison. In that regard, the parison may be completely separated into two or more distinct and separate portions, or only partially opened/breached to expose the interior. One or more support structures 28 or other components may then be placed within the interior of the parison before the parison interior is closed and final molding of the tank performed. Possible molding process and apparatus are disclosed in U.S. patent application Ser. No. 12/491,964 filed Jun. 25, 2009, the disclosure of which is incorporated herein by reference in its entirety. Of course, other molding process and apparatus may be used. The fuel pump and pressure relief valve, if any, could also be incorporated onto/into the parison during the molding process, such as but not limited to when the parison interior is accessible.

As shown in FIG. 1, the support structures 28 may include both internal structures (such as, but not limited to, posts, walls, tethers, beams) and external structures 29 (such as, but not limited to, belts, bands, sleeves, plates, walls) secured to and/or about the exterior of the tank either or both during or after the tank is formed. While shown as at least somewhat discrete components, the support structures could include one or more shells or other layers of material that define a complete enclosure in which an inner tank or shell is received, such as is disclosed in U.S. patent application Ser. No. 13/038,936 filed Mar. 2, 2011, the disclosure of which is incorporated herein by reference in its entirety. Of course, the outer layer or shell need not define a complete enclosure, but could if desired. The inner shell or tank would define the interior chamber in which the fuel is stored. Alternatively, the interior shell or tank need not define an imperforate or complete enclosure and the liquid fuel could instead be ultimately retained by an outer shell or tank.

The relatively high pressure within the fuel tank 10 significantly inhibits or prevents formation of fuel vapor such that vent valves, fuel vapor/carbon canisters and related conduits and connectors are not needed. This greatly simplifies the fuel delivery system, and reduces the number of system components and the cost. Without vent and rollover type valves, and without a vapor canister, there is no need to provide vapor canister purge components and control systems. And there is no possibility of liquid fuel flowing into a vapor canister, so there is no need for baffles and other liquid shields or valves to allow vapor flow but prevent liquid flow to the canister. The system may be lighter (possible improved vehicle fuel economy), uses less material and is easier to recycle.

Figure 2:
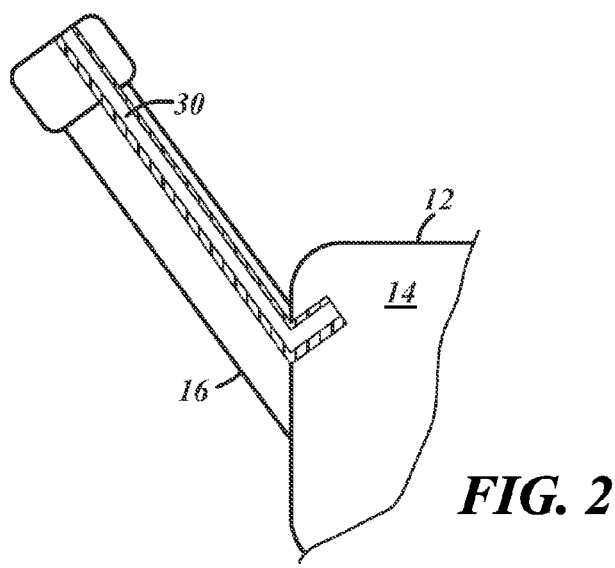
FIG. 2 is a fragmentary diagrammatic view of a portion of an alternate fuel tank system.

FIG. 2 illustrates a vapor conduit or vent line 30 associated with the fill pipe 16. The vent line 30 may be coupled to a complementary feature on a refueling nozzle to provide a gaseous matter flow path from the tank to the refueling nozzle during refueling of the fuel tank. The flow path could be separate from the liquid flow path and, in at least some implementations, may only be opened upon secure and sealed connection to a refueling nozzle. The refueling nozzle, or a component downstream of the nozzle, may be equipped with a system for handling the fuel vapor and preventing undue emissions to the atmosphere. This enables controlled venting of the tank and reduces or eliminates emissions during refueling.

Figure 3:
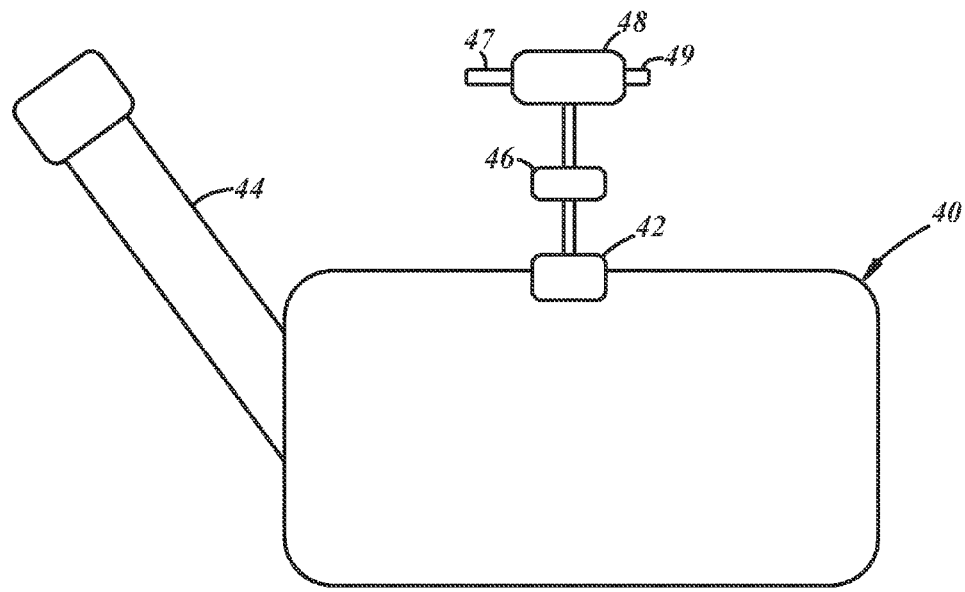
FIG. 3 is a diagrammatic view of a fuel tank system having a vapor canister.

Because refueling nozzles are not currently equipped with components to provide a sealed and secure connection to a fill pipe as described above, FIG. 3 illustrates an embodiment designed for use with existing refueling nozzle technology. In FIG. 3, the fuel tank 40 may be constructed as described above with regard to FIG. 1. A fill level vent valve 42 may be provided in or downstream of the fuel tank 40. As is known in the art, the fill level vent valve 42 may have a valve element that is normally open to permit fuel vapor to leave the fuel tank therethrough and is closed by liquid fuel to prevent liquid fuel flow through the valve. Therefore, when the fuel tank 40 is being refilled, a maximum desired fuel level within the tank can be controlled by the vent valve 42 which closes when the fuel actuates its valve element to prevent further venting of the fuel tank 40. When the vent valve 42 is closed, the addition of further fuel to the tank 40 will increase the pressure within the tank and cause fuel to backup within the fill pipe 44 and actuate a shut-off feature of the refueling nozzle from which fuel is provided.

Downstream of the vent valve 42, a secondary valve 46 may be provided and downstream from the secondary valve 46 a vapor canister 48 may be provided. The secondary valve 46 may be open during the refueling process to permit fuel vapor to flow from the fuel tank to the vapor canister 48, as is known in the art. The secondary valve 46 may be closed at other times to prevent gaseous flow from the tank 40 and thereby provide a sealed or closed tank in which a desired pressure may be maintained. In one of several possible forms, the secondary valve 46 is actuated by a solenoid. Also in one form, an overpressure relief function may be incorporated into the secondary valve 46, or a separate valve may be provided in a bypass flow path between the tank 40 and vapor canister 48, or otherwise from the tank. This prevents the pressure within the tank 40 from exceeding a predetermined maximum pressure. While shown as being physically located downstream of the vent valve 42, the secondary valve 46 could be incorporated in a common housing or structure with the vent valve 42, and/or maybe otherwise carried by the tank 40, and may be downstream of the vent valve in the flow path toward the vapor canister 48. Because the secondary valve 46 is closed at times other than refueling, a roll-over valve is not needed and the fill limit valve 42 can be designed more simply to control the maximum fuel level in the fuel tank 40.

The vapor canister 48 may be small in size and capacity compared to conventional canisters. For example, the larger vapor canisters typically used in U.S. vehicles may be replaced with smaller canisters typically used in European vehicles. And/or the smaller canister may be sized for receiving vapors only during refilling and without also receiving diurnal emission of vapor. This is possible because the vapor canister only receives gasses during the refueling event and not during other operation of the vehicle. Further, because the flow path to the vapor canister 48 is closed at times other than refueling (because the secondary valve 46 is closed), the possibility of liquid flowing to the vapor canister 48 is reduced and likely eliminated such that valves, baffles and other devices are not needed to prevent liquid fuel flow to the canister. Further, complex valve arrangements and control schemes are not needed to manage vapor and liquid flow. Instead, the vapor canister may simply have a port 47 through which vapors are purged to the vehicle engine (for example, without limitation), and a clean air port 49 to the atmosphere.

Figure 4:
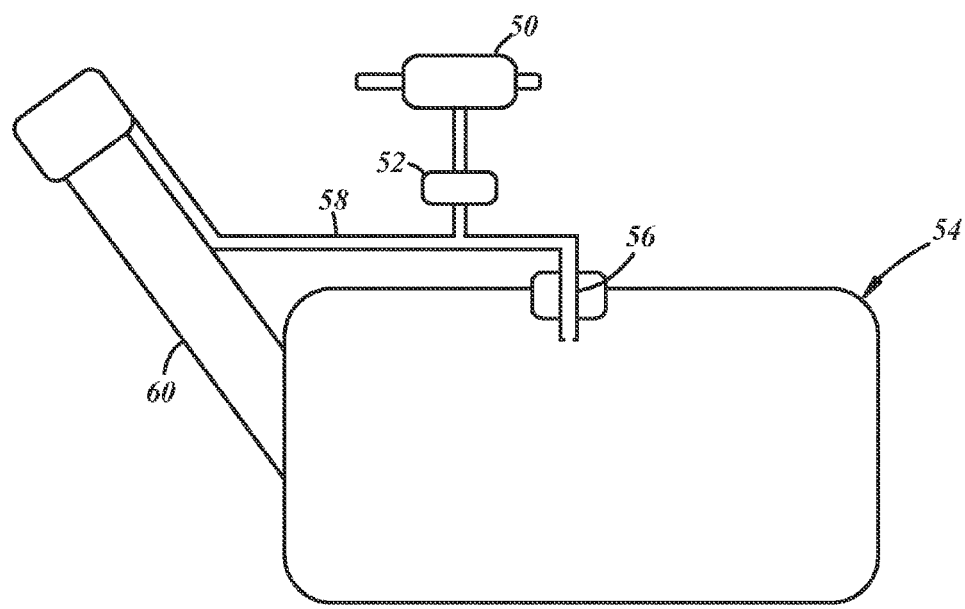
FIG. 4 is a diagrammatic view of another fuel tank system.

FIG. 4 illustrates another implementation of a fuel tank system that also includes a vapor canister 50 and a valve 52 upstream of the vapor canister. The valve 52 may be solenoid actuated or of other design, and is opened before a refueling event to depressurize the fuel tank 54. An overpressure relief valve may be incorporated into the valve 52 or otherwise provided, as noted above. A fill limit nipple 56 may be provided at the tank 54 and include a conduit 58 associated with the fill pipe 60. The conduit 58 may communicate vapor with the refueling nozzle or other component during a refueling event, and a signal may be provided through the conduit 58 to the refueling nozzle when the fuel tank 54 is full (i.e. a maximum desired fuel level is achieved) to terminate the refueling event and prevent overfilling the tank 54. The refueling nozzle may be constructed and arranged to receive the signal and shut-off the flow of fuel into the tank 54 in response. Such fill limit nipple 56 and fuel shut off systems are known and used, for example, in Europe. As above, the valve 52 may be closed except during a refueling event and so no roll over valve is needed. To further inhibit or protect against liquid fuel flowing to the vapor canister, the valve 52 could be opened only before the refueling event and closed during the refueling event. And the system can be formed with relatively few components and provide simpler integration of a smaller vapor canister. Further, the system can provide an increased pressure within the fuel tank at times other than refueling, and can depressurize the tank prior to refueling.

Accordingly, the fuel tank systems may be closed during normal operation in that no fluid flow into or out of the fuel tank system is permitted. A higher pressure may be maintained with the fuel tank systems at least at times other than during a refueling event. This may reduce or prevent the formation of fuel vapor and reduce the size and cost of any vapor handling components, if any such components are needed. Venting of the tank may be permitted during a refueling event and a vapor canister may be included in the venting scheme, if desired. The fuel tank may be reinforced during the manufacturing process or thereafter, to accommodate the increased internal pressure.

Figure 5:
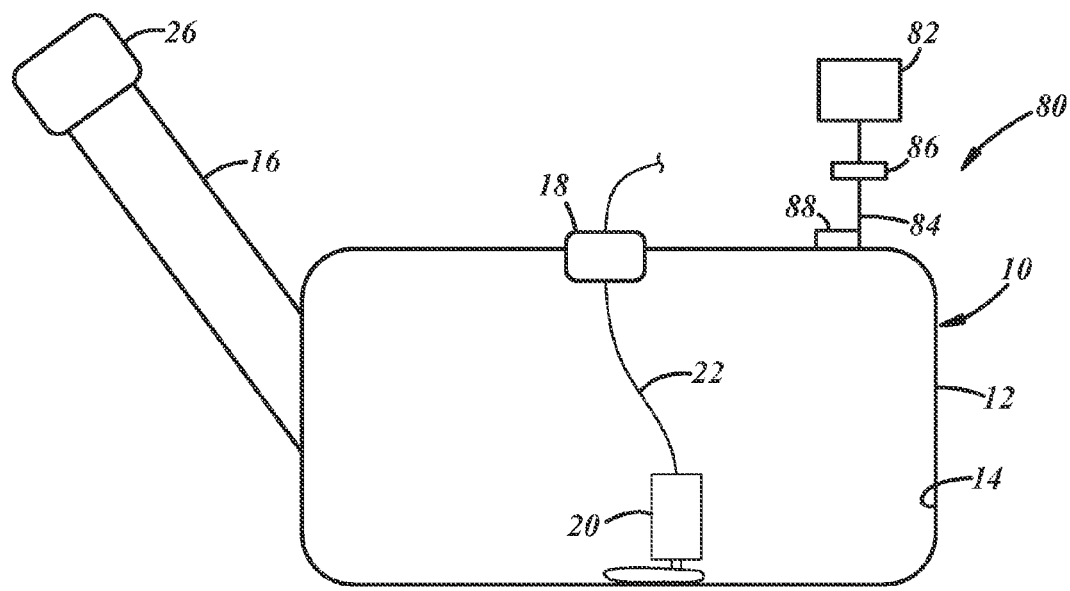
FIG. 5 is a diagrammatic view of a fuel tank system including an auxiliary fluid container.

FIG. 5 illustrates a fuel system 80 like that shown in FIG. 1 and including an auxiliary fluid container 82. Many of the same reference numbers used in FIG. 1 have been used in FIG. 5 for ease of description. The container 82 could, but need not, include any charcoal or other vapor handling material and may instead by a simple enclosure defining a chamber in which vapor/gaseous matter may be received. The container 82 may be formed of any suitable material and could be formed in one piece with the main fuel tank 10 or separately, and may be carried by or remotely from the fuel tank. The container 82 may be communicated with the fuel tank 10 by a suitable passage, which is shown in FIG. 5 as a conduit 84 extending between the tank 10 and container 82. The conduit 84 may provide two-way flow of gaseous matter between the fuel tank and the fluid container (especially if no vapor absorbing material is provided in the container, liquid carryover or flow into the container may not present any problem). To control the flow between the fuel tank 10 and the fluid container 82, a valve 86 may be provided. The valve may be opened to permit flow therethrough and between the tank 10 and container 82 and closed to prevent or at least substantially inhibit such flow. The valve 86 may be solenoid driven or otherwise controlled. Such a fluid container 82 may be used in combination with or instead of a vapor canister, and may be used in other fuel systems than that shown in FIG. 1.

Before and during a refueling event, vapor may be transferred from the tank 10 to the fluid container 82. This may be accomplished with a pump 88, and/or by a pressure differential between the tank and container. After a refueling event, the valve 86 may be opened to release the vapor from the container 82 back into the tank 10. This provides a way to manage vapor during a refueling event and will permit the tank system 80 to remain closed while maintaining a minimal pressure to, for example, forward fuel to a high pressure pump. In at least some implementations, the vapor in the fluid container 82 may condense into liquid (e.g. from a pressure within the container that is above the evaporation level of the fuel) and the liquid may then be transferred back into the tank 10. Here, instead of absorbing vapor as in a charcoal based vapor canister, the vapor is liquefied and returned to the tank.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A fuel tank, comprising:
a tank body defining a chamber adapted to receive liquid fuel therein, and a reinforcement for the tank body to permit the pressure within the chamber to exceed a fuel vapor pressure of at least 35 kPa of a fuel to be received within the chamber;
an inlet to the tank body through which fuel is added to the chamber, the inlet configured to mate with a refueling nozzle through which fuel is added to the chamber to permit refueling the tank and maintaining the pressure in the chamber above atmospheric pressure while liquid fuel is added to the chamber;
a fill pipe that extends from the tank body and communicates with the chamber; wherein the inlet is defined in the fill pipe; and
a conduit associated with the fill pipe and adapted to provide a fluid flow separate from the liquid fuel flow in the fill pipe during a refueling event;
wherein the chamber is closed to the outlet of fuel vapor from the chamber to a pressure of at least 35 kPa during normal use of the fuel tank when liquid fuel is not being added to the chamber of the tank body.

2. The fuel tank of claim 1 which also includes a pressure relief valve that permits flow there through when a pressure within the tank exceeds a threshold pressure which is greater than at least 35 kPa.

3. The fuel tank of claim 1 which also includes a valve adapted to limit the maximum level of fuel that may be received within the chamber during refueling of the chamber.

4. The fuel tank of claim 1 which also includes a vapor canister selectively communicated with the chamber and a secondary valve disposed upstream of the vapor canister to selectively permit fluid flow from the chamber to the vapor canister, the secondary valve being open during a refueling event when fuel is added to the chamber and closed at other times to prevent fluid flow to the vapor canister.

5. The fuel tank of claim 4 which also includes a fill level valve adapted to limit the maximum level of fuel that may be received within the chamber during a refueling event, the fill level valve being arranged between the chamber and the secondary valve.

6. The fuel tank of claim 1 wherein the conduit is adapted to provide a signal to a refueling nozzle to limit the maximum fuel level within the chamber.

7. The fuel tank of claim 1 wherein the conduit is adapted to communicate with a refueling nozzle and permit gaseous flow there through during a refueling event to vent the chamber.

8. The fuel tank of claim 1 which also includes a fluid container communicated with the chamber to permit fuel vapor to flow from the chamber into the fluid container and from the fluid container to the chamber.

9. The fuel tank of claim 8 wherein vapor is turned into liquid in the fluid container and liquid fuel may flow between the fluid container and chamber.

10. The fuel tank of claim 1 which also includes a fluid container communicated with the chamber to permit fluid to flow from the chamber into the fluid container and from the fluid container to the chamber.

11. The fuel tank of claim 8 which also includes a valve that controls fluid flow between the fluid container and the chamber.

12. The fuel tank of claim 8 which also includes a pump to move fluid from at least one of the fluid container or the chamber to the other of the fluid container or the chamber.

13. A fuel tank, comprising:
 a tank body defining a chamber adapted to receive liquid fuel therein, and a valve to limit fluid flow from the chamber and permit the pressure within the chamber to exceed the vapor pressure of a fuel to be received within the chamber;
 an inlet to the tank body through which fuel is added to the chamber, the inlet configured to mate with a refueling nozzle through which fuel is added to the chamber to permit refueling the tank and maintaining the pressure in the chamber above atmospheric pressure while liquid fuel is added to the chamber; and
 a conduit associated with a fill pipe and adapted to provide a fluid flow separate from the liquid fuel flow in the fill pipe during a refueling event;
 wherein the chamber is closed to the outlet of fuel vapor from the chamber to a pressure of at least 35 kPa during normal use of the fuel tank when liquid fuel is not being added to the chamber of the tank body.

14. The fuel tank of claim 13 wherein the conduit is adapted to provide a signal to a refueling nozzle to limit the maximum fuel level within the chamber.

15. The fuel tank of claim 13 wherein the conduit is adapted to communicate with a refueling nozzle and permit gaseous flow therethrough during a refueling event to vent the chamber.

16. A fuel tank, comprising:
 a tank body defining a chamber adapted to receive liquid fuel therein, and a reinforcement for the tank body to permit the pressure within the chamber to exceed a fuel vapor pressure of a fuel to be received within the chamber;
 an inlet to the tank body through which fuel is added to the chamber, the inlet configured to mate with a refueling nozzle through which fuel is added to the chamber to permit refueling the tank and maintaining the pressure in the chamber above atmospheric pressure while liquid fuel is added to the chamber;
 a fuel pipe that extends from the tank body and communicates with the chamber, the inlet being defined in the fill pipe; and
 a conduit associate with the fill pipe and adapted to provide a fluid flow separate from the liquid fuel flow in the fill pipe during a refueling event to provide a signal to a refueling nozzle to limit the maximum fuel level within the chamber during the refueling event.

17. A fuel tank, comprising:
 a tank body defining a chamber adapted to receive liquid fuel therein, and a reinforcement for the tank body to permit the pressure within the chamber to exceed a fuel vapor pressure of a fuel to be received within the chamber;
 an inlet to the tank body through which fuel is added to the chamber, the inlet configured to mate with a refueling nozzle through which fuel is added to the chamber to permit refueling the tank and maintaining the pressure in the chamber above atmospheric pressure while liquid fuel is added to the chamber; and
 a fluid container communicated with the chamber to permit fuel vapor to flow from the chamber into the fluid container and from the fluid container into the chamber and wherein fuel vapor is turned into liquid fuel in the fluid container and liquid fuel may flow between the fluid container and chamber.

* * * * *